United States Patent
Lee et al.

(10) Patent No.: US 7,631,018 B2
(45) Date of Patent: *Dec. 8, 2009

(54) FLASHBACK DATABASE

(75) Inventors: J. William Lee, Redwood Shores, CA (US); Juan Loaiza, Redwood City, CA (US); Michael J. Stewart, Belmont, CA (US); Wei-Ming Hu, Palo Alto, CA (US); William H. Bridge, Jr., Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 11/652,782

(22) Filed: Jan. 11, 2007

(65) Prior Publication Data

US 2007/0244918 A1    Oct. 18, 2007

Related U.S. Application Data

(63) Continuation of application No. 10/427,511, filed on Apr. 30, 2003, now Pat. No. 7,181,476.

(51) Int. Cl.
*G06F 17/30* (2006.01)
*G06F 15/16* (2006.01)

(52) U.S. Cl. ........................... 707/203; 707/202
(58) Field of Classification Search .............. 707/202, 707/203
See application file for complete search history.

(56) References Cited

U.S. PATENT DOCUMENTS

| | | | |
|---|---|---|---|
| 5,369,764 A | 11/1994 | Blair | |
| 5,721,918 A | 2/1998 | Nilsson et al. | |
| 5,778,165 A | 7/1998 | Saxon | |
| 5,850,507 A | 12/1998 | Ngai et al. | |

(Continued)

FOREIGN PATENT DOCUMENTS

EP    0618534    10/1994

(Continued)

OTHER PUBLICATIONS

International Searching Authority, International Search Report and Written Opinion, PCT/US2004/010017, dated May 27, 2005, 19 pgs).

(Continued)

*Primary Examiner*—John E Breene
*Assistant Examiner*—Alex Gofman
(74) *Attorney, Agent, or Firm*—Hickman Palermo Truong & Becker LLP

(57) ABSTRACT

Techniques are described herein for returning a repository to a prior state. The repository may be, for example a database, and the prior state may be, for example the consistent state that the database had at a particular point in time in the past. When a operator-caused error has been introduced to the database by changes made by an already-committed transaction, the techniques described herein may be used to recover from the error by returning the database to a point in time prior to the commit time of the transaction that introduced the error. The techniques involve the generation of "physical undo" information, and the use of the physical undo information in conjunction with physiological undo and physiological redo to efficiently return a repository to the prior state.

40 Claims, 5 Drawing Sheets

U.S. PATENT DOCUMENTS

| | | | |
|---|---|---|---|
| 5,857,204 A * | 1/1999 | Lordi et al. | 707/202 |
| 5,983,361 A | 11/1999 | Lee et al. | |
| 5,996,088 A | 11/1999 | Frank et al. | |
| 2002/0116404 A1 | 8/2002 | Cha et al. | |
| 2003/0061537 A1 | 3/2003 | Cha et al. | |

OTHER PUBLICATIONS

Current Claims, PCT/US2004/010017, pp. 1-5, 2004.

European Patent Office, "Communication Pursuant to Article 96(2) EPC," App. No. 04760515.9, dated Juje 8, 2006, 5 pgs.

Current Claims, Appl No. 04760515.9, 7 pgs, 2004.

Aaron B. Brown et al., "Rewind, Repair, Replay: Three R's to Dependability", undated, 8 pgs, 2002.

D.S. Milojicic et al. S.J. 1995. Operating system support for concurrent remote task creation. In Proceedings of the $9^{th}$ International Symposium on Parallel Processing (Apr. 25-28, 1995). IPPS. IEEE Computer Society, Washington, D.C.

J. Lin et al. 1996. Segmented fuzzy checkpointing for main memory databases. In Proceedings of the 1996 ACM Symposium on Applied Computing, Feb. 17-19, SAC '96. ACM Press, NY, NY, 158-165.

C.B. Zilles. 2002 Master/Slave speculative parallelization and approximate code. Doctoral Thesis. UMI Order No. AA/3072828.

* cited by examiner

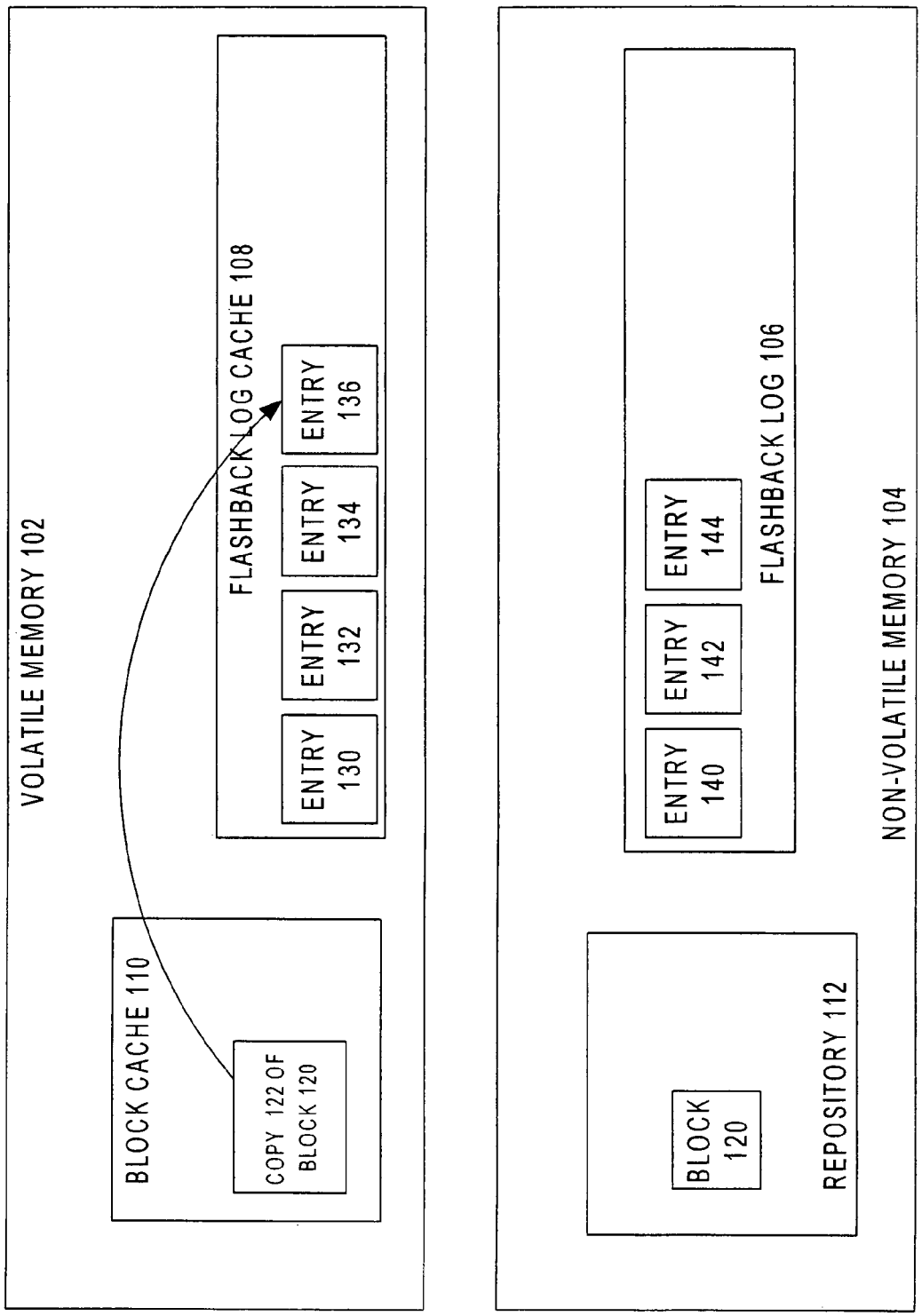

FLASHBACK DATABASE

PRIORITY CLAIM

This application claims domestic priority under 35 U.S.C. 120 as a continuation of U.S. patent application Ser. No. 10/427,511, filed Apr. 30, 2003 now U.S. Pat. No. 7,181,476, entitled "FLASHBACK DATABASE," of J. William Lee et al., the entire disclosure of which is hereby incorporated by reference for all purposes as if fully set forth herein.

FIELD OF THE INVENTION

The present invention relates to data management systems and, more specifically, to techniques for restoring a set of data to a previous state.

BACKGROUND OF THE INVENTION

There are any number of problems that can occur when using a computer. Two general categories of errors include computer-caused-errors and operator-caused-errors. Due to the different nature of these two types of errors, a technique designed to recover from computer-caused-errors cannot necessarily be used to recover from human operator-caused-errors.

For example, one technique used to recover a database after a computer-caused-error (such as the failure of a node or process) involves maintaining logs of operations. Specifically, a redo log is maintained so that changes made in volatile memory by transactions that committed before a failure can be made persistent to the database after the failure. Similarly, an undo log is maintained so that changes made persistent by transactions that did not commit before the failure can be removed from the database after the failure.

The log-based recovery technique described above does not address the problem of operator-caused-errors because those errors may be reflected in changes made by committed transactions. Even when the committed transaction that reflects the human error is followed by a computer-caused-error, the log-based recovery operation will merely ensure that those erroneously performed changes continue to be reflected in the database after recovery from the computer-caused-error. Thus, computer-caused-error recovery techniques tend to distinguish between committed changes and uncommitted changes, and not between correct committed changes and erroneous committed changes.

In contrast to computer-caused-error recovery techniques, operator-caused-error recovery techniques focus on removing from the database both committed and uncommitted changes. Specifically, operator-caused-error recovery techniques typically focus on returning the database to a consistent state that existed at a particular point in the past (preferably before the commit time of the transaction that incorporated the operator-caused error). For example, one operator-caused-error recovery technique involves making a backup of the database at a particular point in time. If an operator-caused-error is introduced after that time, the operator-caused-error may be "removed" by reverting to the backup copy of the database.

Of course, a database administrator rarely knows ahead-of-time that an operator-caused-error is going to be introduced. If too much time has passed between the last backup operation and the time of the error, it could be very impractical and inefficient to revert back to the backup database, and then reapply all of the changes that occurred subsequent to the backup operation but prior to the error.

Another technique involves maintaining a "mirror" database whose state is delayed relative to the primary database. In case of a user-caused-error, one can revert to the mirror database. However, if the time it takes to discover the error is greater than the length of the delay, even the delayed mirror will reflect the error. Further, while a long delay will improve the chances that the error will be caught in time, it will also increase the inefficiencies associated with failover to the mirror.

A variation of the delayed-mirror technique involves maintaining multiple delayed mirror databases, where each mirror database has a different delay length. The use of multiple mirrors with different delays increases the likelihood that at least one mirror will represent a state that is before, but not long before, the time of the error. However, the maintenance of such mirrors consumes more resources than there may be available to dedicate to this purpose.

An alternative technique involves storing the database on a storage subsystem that support "snapshots", and then using the snapshot mechanism of the subsystem to revert the storage subsystem back to a snapshot time that precedes the error. For example, a storage subsystem may establish a particular "snapshot time" of T5. After T5, each change to a block in the subsystem is handled by (1) determining whether the block has already been changed after T5, and if not, then (2) before making the change to the block, reading the pre-change version of the block from the subsystem and copying it to a special separate "snapshot storage" associated with the T5 snapshot. Using this technique, the storage subsystem can be returned to the state in which it existed at time T5 by copying the blocks from the T5 snapshot storage back over their corresponding blocks in the storage subsystem.

Further, even without reverting the storage subsystem back to its prior state, it is possible to allow processes and transactions to see the state of the subsystem as of time T5 by performing the following when the process or transaction wants to see a specific block: (1), providing a copy of the specific block from the T5 snapshot storage if a copy of the specific block is in the T5 snapshot storage, and (2) providing the copy of the specific block from the storage subsystem only if there is no copy of the block in the T5 snapshot storage.

The snapshot technique provides accurate results, but does so by imposing a potentially significant amount of overhead to all write operations. Specifically, upon the first update to any block after any snapshot time, the pre-update image of the block must be read, and then written out to the appropriate snapshot storage. Further, when the database administrator has to return the storage subsystem to a previous state, the administrator is limited to only those states at which a snapshot time was explicitly established.

Operator-caused-errors are merely one type of error that is not easily removed by applying physiological undo. For example, difficulties may arise when attempting to recover from logical data corruptions. For example, such corruptions may simply be "replayed", similar to operator-caused-errors, if redo is reapplied.

Based on the foregoing, it is clearly desirable to provide a mechanism and technique for recovering from re-playable errors in manner that does not suffer the efficiency or resource consumption problems inherent in the approaches described in this section.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which:

FIGS. 1A-1C are block diagrams that illustrate a system with a flashback log according to an embodiment of the invention;

DETAILED DESCRIPTION OF THE INVENTION

Figure 1A:
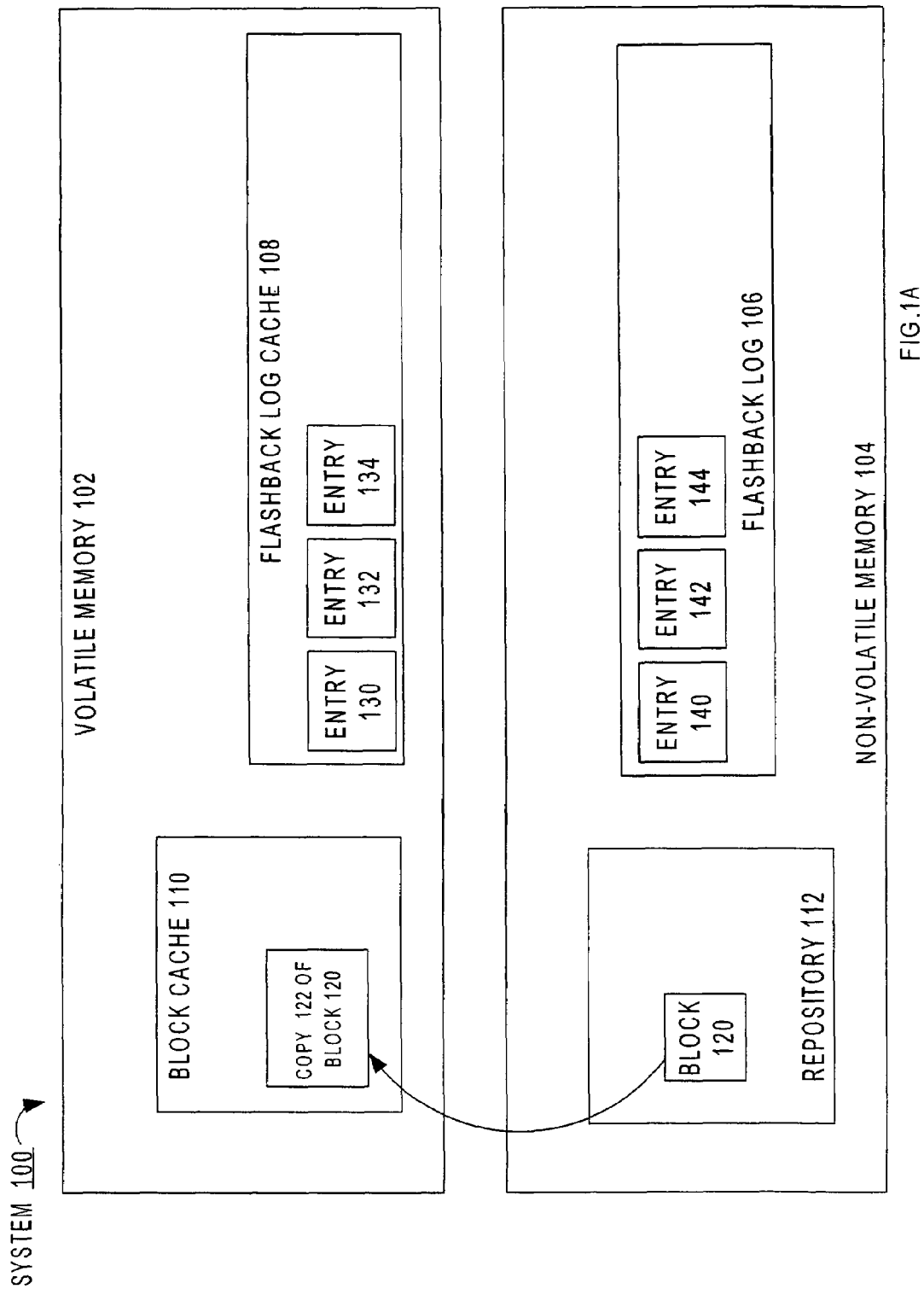

Techniques for reverting a repository to a prior state are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for returning a repository to a prior state. According to one embodiment, the repository is a database, and the prior state is the consistent state that the database had at a particular point in time in the past. Specifically, the prior state is a state in which the database reflects all changes made by transactions that had committed before the particular point in time, and none of the changes made by transactions that had not committed before the particular point in time. In another embodiment, the repository is one or more files on disk.

When an operator-caused error has been introduced to the database by changes made by an already-committed transaction, the techniques described herein may be used to recover from the error by returning the database to a point in time prior to the commit time of the transaction that introduced the error. The techniques involve the generation of "physical undo" information, and the use of the physical undo information in conjunction with physiological undo and physiological redo to efficiently return the repository to the prior state.

Physical Undo

Physical undo includes information necessary to return a unit of storage back to a previous state. The term "block" shall be used herein to refer to the unit of storage that is treated as an atomic unit for the purpose of maintaining physical undo. The techniques described herein are not limited to blocks of any particular size or granularity.

According to one embodiment, the physical undo for a block is a pre-update image of the block. The pre-update image of an updated block can be used to return the updated block to a pre-update state simply by over-writing the updated block with the pre-update image of the block. However, a pre-update image is merely one form of information that can be used to return a unit of storage back to a previous state, and the techniques described herein are not limited to any particular form of physical undo.

Using the techniques described herein, every operation that writes an updated block to disk does not incur the additional overhead of a disk read operation to obtain a pre-update image of the block. Rather, when updates are performed by a database server, the database server will usually already have a copy of the block in volatile memory. Thus, the generation of physical undo may merely involve making a second copy of the block in volatile memory prior to updating the first copy. As described in greater detail below, the second, pre-update copy is flushed to disk at a later time, but not later than the time at which the updated image of the block is flushed to disk.

Physiological Undo

Physiological undo includes information necessary to restore individual pieces of logical information to a previous state. For example, within a relational database system, if a row of a table is updated, a physiological undo record may be generated. In this scenario, the physiological undo record will contain information for returning the row to its pre-update state, but may not have information about the state of other data items that may happen to reside on the same data block as the updated row.

Compared with physiological undo, physical undo has an advantage. The application of physical undo always succeeds because it does not require any assumption about the pre-apply image. So physical undo can always back out logical data corruptions. On the other hand, the application of physiological undo may fail if the pre-apply image is not self-consistent. A block may become self-inconsistent because of memory corruption, bugs in software, etc.

Physiological Redo

Similar to physiological undo, physiological redo stores information about changes to logical data items. However, while physiological undo stores information about how to undo changes to the logical data item, physiological redo stores information about how to re-perform changes to the logical data item. Physiological redo is used, among other things, to re-perform changes made by committed transactions, where those changes had not yet been stored to persistent storage at the time a computer-caused error occurred.

Many database systems maintain physiological undo and redo for the purpose of recovering from computer-caused-errors, as described above. An example of a physiological redo and undo mechanism is described in U.S. Pat. No. 5,850,507, entitled "Method And Apparatus For Improved Transaction Recovery", the contents of which are incorporated herein by this reference. However, the techniques described herein are not limited to any particular mechanism for maintaining physiological redo and undo.

Two-Phase Recovery

According to one embodiment of the invention, a repository is returned to a previous state in two phases, referred to herein as the "physical recovery phase" and the "physiological recovery phase". For example, assume that a user wishes to revert a repository back to the state that existed at a particular point in time (the "target time"). During the physical recovery phase, the physical undo is used to return all disk blocks associated with the repository to their physical state at a point in time (the "physical recovery time"). During the physiological recovery phase, the physiological redo and undo are used to move the logical information within the repository from its post-physical-recovery state to a consistent state associated with the target time.

It should be noted that even when the physical recovery time is the target time, the physiological recovery phase might still be necessary to return the logical data within the blocks to a consistent state. For example, at time T5, a given block may (1) include changes made by transactions that have not committed as of time T5, and (2) be missing changes made by transactions that have committed prior to T5. Thus, returning the block to its physical state at time T5 does not necessarily return the logical data items that are on the block to their consistent state at time T5. Thus, physiological redo is applied to add to the T5 image of the block any missing changes made by transactions that had committed prior to T5. Similarly, physiological undo is applied to remove, from the T5 physical image of the block, any changes made by transactions that had not committed as of time T5.

Gates

According to one embodiment, the system that manages a repository establishes specific points in time, referred to herein as "gates", for which to generate physical undo. For the purpose of explanation, it shall be assumed that the repository is a database. In such an embodiment, the system that manages the repository and establishes the gates is a database server.

The physical undo generated for a gate is used to return the blocks that store the repository back to the physical state in which they existed at the time associated with the gate. For example, if a gate G1 is established for time T5, then the physical undo generated for gate G1 has information to return blocks to the physical state in which they existed at or prior to time T5. In one embodiment, the physical undo for G1 includes the pre-update images of all blocks that were updated after T5. The pre-update image of a block contains all of the data in the block, even though the update may only change one of several logical data items stored on the block. Thus, the blocks of the repository may be returned to their physical state at T5 simply by overwriting the updated version of the blocks with their corresponding pre-update images.

According to one embodiment, the physical redo for a gate is established by storing re-update images of blocks when they are updated for the first time after the time associated with the gate. Specifically, a pre-update image is generated in response to any update that is made (1) after the gate time (2) to any block that had not previously been updated since the gate. Such updates are referred to herein as "first-after-gate updates".

For example, consider the gate G1 associated with the time T5. Assume that a block is updated after T5. If the block had already been updated after T5, then the update is not a first-after-gate update, and no physical undo is generated for G1 in response to the update. On the other hand, if the block is being updated for the first time after T5, then the update is a first-after-gate update, and a pre-update image of the block is generated as physical undo for gate G1.

A variety of techniques may be used to identify which updates qualify as first-after-gate updates. For example, a timestamp may be placed in a header of each block to indicate the last time the block was updated. If the timestamp in the block header of a block that is being updated is higher than the timestamp of the gate, then some processes have already updated the block at least once after the gate, so the current update is not a first-after-gate update. On the other hand, if the timestamp in the block header of the block that is being updated is lower than the timestamp of the gate, then the current update is a first-after-gate update. Alternatively, data can be stored in volatile memory to indicate which blocks have already been updated since the most recent gate. The present invention is not limited to any particular technique for identifying which updates qualify as first-after-gate updates.

The Flashback Log

According to one embodiment, the physical undo records for gates are stored as entries in a "flashback log". As shall be described in greater detail hereafter, a single flashback log can be used to store pre-update images associated with many gates, where markers are used to correlate positions in the flashback log with specific gates.

FIG. 1a illustrates a system 100 to which reference shall be made to explain techniques for managing the physical undo, according to an embodiment of the invention. Referring to FIG. 1a, system 100 includes volatile memory 102 and non-volatile memory 104. Non-volatile memory 104 includes a repository 112 for storing data. The repository 112 may be, for example, a database managed by a database server, and the operations described herein to manage, maintain, and use the physical undo may be performed automatically by processes within the database server. However, the techniques described herein are applicable to any type of repository that may have to be returned to a previous state, and is therefore not limited to the context of conventional database servers.

In addition to repository 112, non-volatile memory 104 includes a flashback log 106. Flashback log 106 stores entries (e.g. entries 140, 142, 144) that (1) correspond to blocks within repository 112, and (2) include information for returning the corresponding blocks back to a prior state. According to one embodiment, each entry in flashback log 106 contains a pre-update image of a corresponding block in repository 112.

Volatile memory 102 includes a block cache 110 and a flashback log cache 108. Block cache 110 holds copies of blocks from repository 112. For example, for a process to read a data item from block 120 of repository 112, a copy 122 of the block 120 is loaded into the block cache 110 within volatile memory 102. If the process then updates the data item, the update will initially be reflected in the cached copy 122 of block 120, and not in the block 120 that resides on non-volatile memory 104.

Figure 1C:
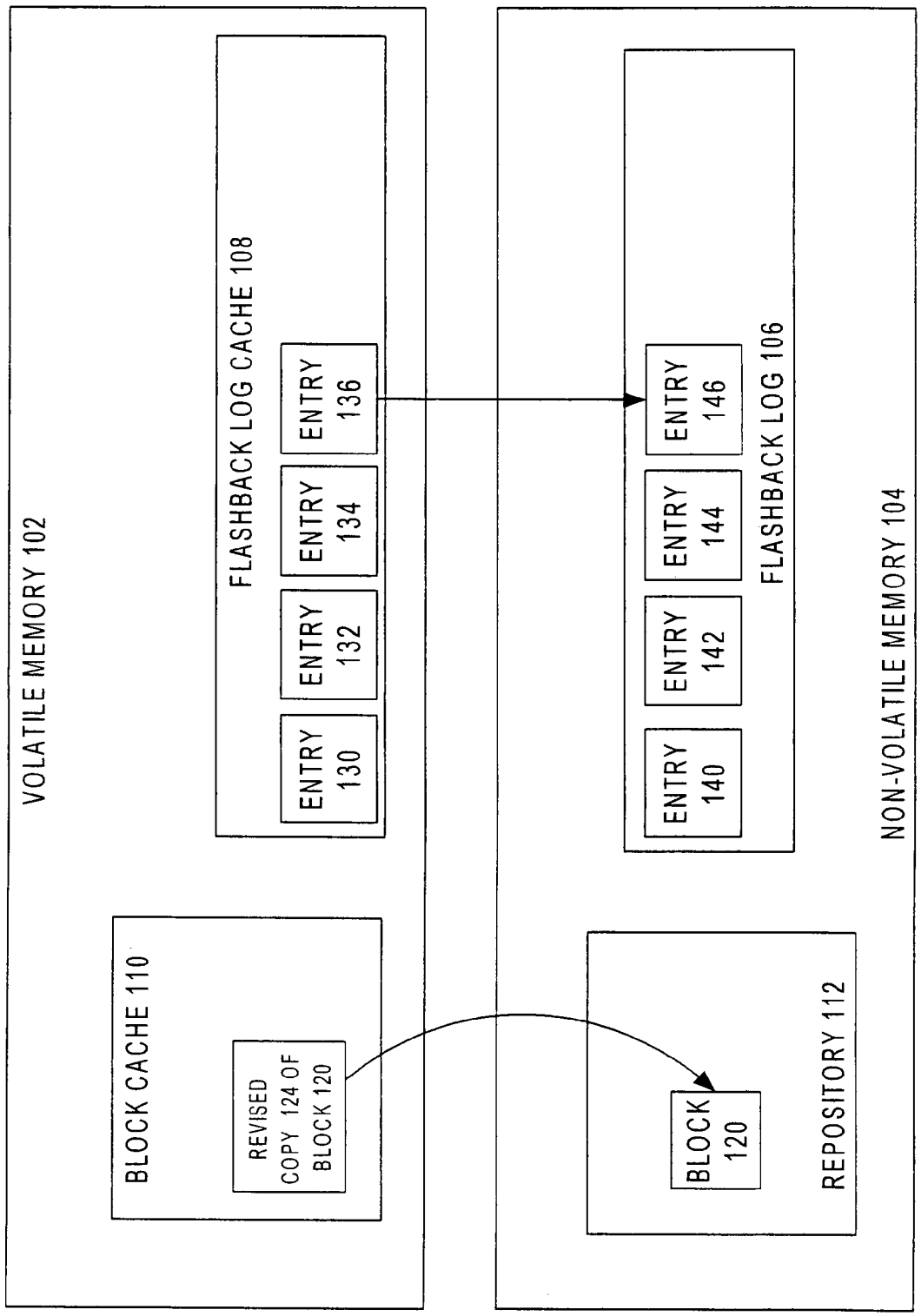

Volatile memory 102 further includes a flashback log cache 108. Flashback log cache 108 stores flashback log entries (e.g. entries 130, 132 and 134) that have been created but which have not yet been flushed to nonvolatile memory 104. For example, if copy 122 of block 120 is going to be modified, it may be necessary to generate a flashback log entry (e.g. entry 136 in FIG. 1B) containing the pre-update image of block 120. The flashback log entry will initially be stored in flashback log cache 108, and then later flushed to the flashback log 106 on non-volatile memory 104. In FIG. 1C an entry 146 has been added to flashback log 106 in response to entry 136 being flushed to non-volatile memory 104.

Anticipatory Physical Undo Generation

In the embodiment described above, a flashback log entry is generated in response to every update that is made (1) after a gate (2) to a block that had not previously been updated after that gate. Unfortunately, this technique results in a "spike" in the number of flashback log entries that have to be generated immediately after any given gate. Specifically, virtually all updates that occur immediately after passing a gate will be first-after-gate updates. Thus, immediately after a gate, the percentage of update operations that require the generation of flashback log entries is virtually 100%. After the initial spike, the percentage of updates that require the generation of flashback log entries will decrease, as a greater percentage of the updates will be to blocks that have already been updated after the gate.

According to one embodiment, the magnitude of the spike is reduced by performing anticipatory physical undo generation. Specifically, flashback log entries are generated for updates that are not first-after-gate updates. Rather, they are generated for a gate even before the time associated with the gate. Such flashback log entries, referred to herein as "anticipatory entries", reduce the spike that occurs when the gate is reached because no additional flashback log entries may need to be generated for the first-after-gate updates to blocks that have anticipatory entries.

According to one embodiment, an anticipatory gate is established prior to an actual gate. However, unlike actual gates, the first update made to a block after an anticipatory gate does not automatically cause generation of a flashback entry. Rather, generation of a flashback entry after an anticipatory gate is optional. Whether an entry is generated under these circumstances may hinge on a variety of factors, such as the workload of the system and the availability of resources. For example, whether a flashback entry is generated in response to an update made after an anticipatory gate may hinge on how much space is currently available in flashback log cache 108. As another example, the system may simply generate flashback entries for a certain percentage, such as 50%, of all first-after-anticipatory-gate updates. These factors are merely examples of factors that may be used to determine whether a flashback entry is generated for an update after an anticipatory gate. The techniques described herein are not limited to any particular set of factors.

When an anticipatory flashback entry has been generated for a gate, the anticipatory flashback entry may not reflect the state of the corresponding block at the time associated with the gate. For example, assume that G1 is associated with time T5, and that an anticipatory gate for G1 is published at time T3. All anticipatory flashback entries that are generated between T3 and T5 will reflect the state of blocks at some point in time between T3 and T5, and not necessarily the state of blocks at time T5.

For example, a block B1 may be updated at time T4, causing an anticipatory flashback entry to be generated. If the flashback entries associated with gate G1 are subsequently used to revert the database back to time T5, the anticipatory flashback entry for B1 will actually revert block B1 back to time T4. Thus, when anticipatory gates are used, the repository will be "fuzzy" after the physical recovery phase. Specifically, after the physical recovery phase, some blocks will reflect their physical state at time T5, and other blocks will reflect their physical state between times T3 and T5.

The use of anticipatory gates is only one example of techniques that may cause such "fuzziness". For example, the two-phase broadcast technique described hereafter for multiple server systems may also result in pre-update images that reflect states before the time associated with the corresponding gate. Also, when a gate occurs "concurrently" with the generation of physical undo, the physical undo may be assigned a timestamp that precedes the gate. However, regardless of the cause, this "fuzziness" is eliminated during the physiological recover phase, when all logical data items are returned from whatever state they are currently in to the target state.

Gate Markers

As mentioned above, flashback entries are initially stored in a flashback cache 108, and periodically flushed to flashback log 106 on non-volatile memory 104. According to one embodiment, a single flashback log 106 is used for several gates, where markers (referred to herein as "gate markers") are inserted into the flashback log 106 to indicate the start of entries that are associated with the particular gates.

Figure 2:
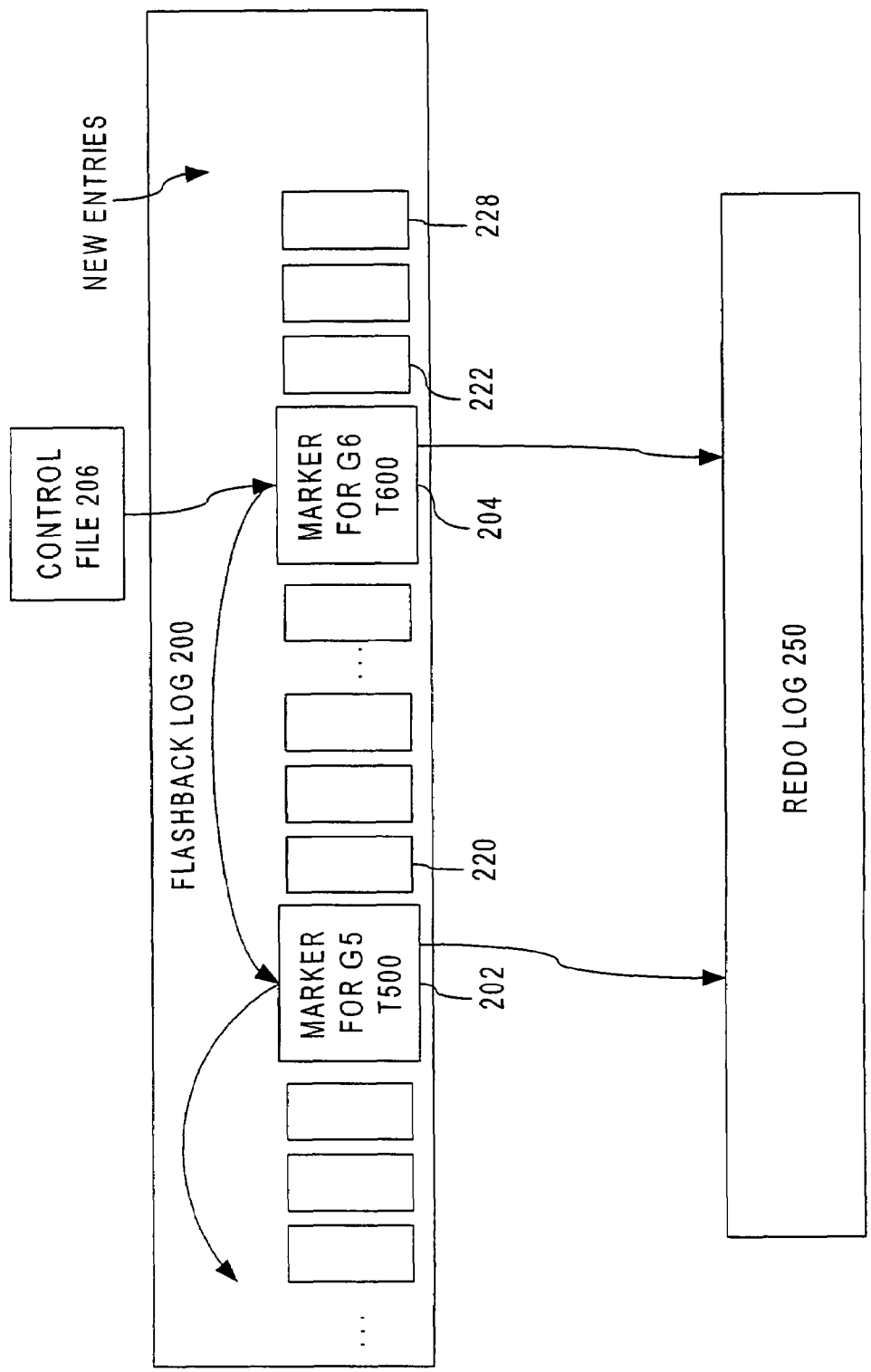
FIG. 2 is a block diagram showing gate markers embedded in a flashback log, according to an embodiment of the invention.

FIG. 2 is a block diagram that illustrates a flashback log 200 that has been populated according to an embodiment of the invention. Referring to FIG. 2, flashback log 200 is populated sequentially (in the illustrated embodiment, from left to right) as flashback entries are flushed from cache to persistent storage.

According to one embodiment, gate markers are stored in the flashback log 200 to facilitate the application of flashback entries associated with a given gate. In the illustrated example, flashback log 200 includes a gate marker 202 associated with a gate G5 of time T500, and a gate marker 204 associated with a gate G6 of time T600.

Gate Marker Chain

According to one embodiment, the various gate markers within flashback log 200 are linked together so that they may be quickly located within flashback log. In the illustrated embodiment, each gate marker includes a link to the immediately preceding gate marker, and a control file 206 includes a link to the most recently stored gate marker. When linked in this fashion, any given gate marker can be located quickly by following the link in the control file 206 to the most recent gate marker, and then following the links within the gate markers back to the desired gate marker. For example, to locate gate marker 202, the link within control file 206 is used to locate gate marker 204, and the link within gate marker 204 is used to locate gate marker 202.

When a new gate marker is added to flashback log 200, the gate marker chain is maintained by causing the new gate marker to point to the gate marker currently pointed to by the control file, and then causing the control file to point to the newly inserted gate marker. For example, if a new gate marker is added to flashback log 200, the new gate marker would have a link to gate 204, and the link within control file 206 would be updated to point to the new gate marker.

Gate Marker Use

According to one embodiment, the gate marker for a particular gate serves a variety of purposes, including: (1) marking a location within the flashback log and (2) identifying a location within a physiological redo log. In one embodiment, the location of a gate marker within the flashback log indicates where to start processing flashback entries in order to return the repository to the time associated with the corresponding gate. For example, to return a repository to the physical state associated with time T500, the flashback log 200 would be processed beginning with entry 220 all the way to entry 228 at the end of the flashback log. On the other hand, to return the repository to the physical state associated with time T600, the flashback log 204 could be processed beginning with entry 222 all the way to entry 228 at the end of the flashback log.

In an alternative embodiment, a pointer within the gate marker, rather than the position of the gate marker itself, is used to identify the location to begin processing the flashback log for the corresponding gate. By using a pointer to indicate the start location in the flashback log, the sequence in which the gate marker itself is stored to the flashback log is less critical. For example, a gate G1 associated with time T500 may be published when the flashback log is at position P1. If the position of the gate marker is to be used to identify the location at which to begin processing, then some mechanism must be provided to ensure that no flashback entries associated with G1 are stored in the flashback log ahead of the gate marker for G1, so that the gate marker for G1 is stored at position P1. However, if a pointer is used, then other flashback entries generated for G1 can be flushed to disk ahead of the gate marker for G1. The gate marker for G1, stored somewhere in the flashback log after P1, will simply include a pointer to indicate position P1.

When a flashback entry is processed, the corresponding block of the repository is reverted back to the image in the flashback entry unless the flashback entry reflects an update that is later than the time associated with the gate that is being used to revert the repository. For example, if flashback entries 220 and 222 both correspond to the same block B1, and the repository is being reverted back to time T500 associated with gate G5, then block B1 will be reverted based on flashback entry 220, but will not be reverted based on flashback entry 222 because flashback entry will reflect an update made to block B1 after T500.

In the examples given above, the gate markers serve to indicate the location at which to start applying flashback entries. In an alternative embodiment, flashback entries may be applied in reverse order, starting with the most recent entry and proceeding to the appropriate gate marker (or location indicated by a pointer in the gate marker). Under these circumstances, the gate marker or pointer indicates where to stop processing the flashback entries. Also, when the flashback log is processed from newest to oldest, a flashback entry is skipped when a timestamp associated with the entry is newer than the time of the gate that is being used for recovery. For example, in the case where both entries 220 and 222 correspond to the same block B1, and the repository is being reverted back to time T500 associated with gate G5, entry 222 will be skipped because it would be associated with a timestamp that is greater than time T500. In other words, entry 222 is skipped because the image of block B1 reflected in entry 222 includes a change that was made after time T500. On the other hand, entry 220 would be applied, because entry 220 would be associated with a timestamp that precedes time T500 and would reflect the physical image of block B1 at a time prior to T500. As mentioned above, flashback entries may be applied in chronological order, or in reverse chronological order. In fact, flashback entries may be processed in any order. If there are multiple flashback entries for a block with a timestamp earlier than the time associated with the gate that is being used to revert the repository, then the image from any one of the entries is good enough as the restored image of the block after the "physical recovery phase." The ability to apply flashback entries in any order is particularly useful in systems capable of applying the flashback entries in parallel, thereby further increasing the efficiency of the recovery operation. For example, subsets of the flashback entries that need to be applied may be distributed to several processes. Each of those processes may then apply its assigned flashback entries with minimal coordination with the other processes.

As mentioned above, in one embodiment, each gate marker also includes a pointer to a location in a physiological redo log (a "redo pointer"). Specifically, the redo pointer that is stored in a gate marker indicates a location in a physiological redo log 250 to begin processing redo records after the repository has been reverted back to the gate associated with the gate marker. For example, assume that the repository is to be returned to time T550. During the physical recovery phase, the first gate at or before the target time T550 is identified. In the present example, the gate marker chain is followed back to marker 202, which corresponds to time T500. The flashback entries that follow gate marker 202 are then applied to revert the repository back to its physical state at time T500.

After the physical recovery phase, the repository will reflect the physical state of the blocks at or prior to time T500. Consequently, some of the changes made by transactions that committed before T550 may not be reflected in the physical state of the repository at time T500. To cause these changes to be reflected, physiological redo records are applied, beginning at the location in the redo log 250 that is indicated by the redo pointer of gate marker 202. Application of the redo records rolls forward the logical data items in the repository to their consistent state as of time T550. Also during the physiological recovery phase, physiological undo is applied to remove from the logical data items any updates that (1) were in the physical image, but (2) were made by transactions that had not yet committed as of time T550.

Multiple Server Systems

In some database systems, multiple database servers may have access to the same database. According to one embodiment, each of the database servers that has access to a database maintains its own set of logs to recover the database, including a flashback log and a physiological redo log. The various database servers may also have separate physiological undo logs, or there may be a single shared physiological undo log for all database servers. To revert the database back to a previous state, recovery information from all logs of all servers may be required. For example, after a particular gate G3, one server S1 may perform the first-after-gate update to block B1, another server S2 may perform the first-after-gate update to block B2, and yet another server S3 may perform the first-after-gate update to block B3. Under these circumstances, if the database is to be reverted back to gate G3, a flashback record from the flashback log of S1 will have to be applied to B1, a flashback record from the flashback log of S2 will have to be applied to B2, and a flashback record from the flashback log of S3 will have to be applied to B3.

Unfortunately, communication between the various servers is not instantaneous. The time lag in the inter-server communications can lead to synchronization problems with respect to the establishment of gates. For example, assume that server S1 establishes a gate G3 associated with 5 pm. If inter-server communication were instantaneous, at time 5 pm server S1 could publish gate G3, and S2 and S3 would accurately start generating flashback entries for all first-after-gate updates after G3. However, notice of G3 may not arrive at S2 until one second after 5 pm, and at S3 until three seconds after 5 pm. Consequently, G3 will be missing flashback entries for updates made by S2 between 5 pm and one second after 5 pm. Similarly, G3 will be missing flashback entries for updates made by S3 between 5 pm and three seconds after 5 pm.

According to one embodiment, this synchronization problem is addressed by establishing gates using a two-phase process. During the first phase, a server that has been designated to be a "coordinator" sends a "begin-logging" message to all other servers. In response to the begin-logging message, each other server (1) sends to the coordinator a response message that indicates the position of the current insertion point in its flashback log, and (2) begins generating flashback entries for every update that it makes.

For example, assume that S2 receives a begin-logging message from S1, and the current insertion point in the flashback log of S2 is S2-POS1. In response to the begin-logging message, S2 (1) sends a response to S1 indicating its current position S2-POS1, and (2) begins generating flashback entries for every update that it makes. Similarly, if the current insertion point in the flashback log of S3 is S3-POS1 when S3 receives a begin-logging message from S1, then in response to the begin-logging message, S3 (1) sends a response to S1 indicating its current position S3-POS1, and (2) begins generating flashback entries for every update that it makes.

When the coordinator has received responses from all of the other servers, the coordinator (1) establishes a gate that is associated with a time no earlier than the time at which the last response was received, and (2) generates a marker for the gate. For example, assume that S1 receives the last response at 5 pm, and establishes a gate G3 associated with the time 5 pm. After establishing the gate, the coordinator sends a "gate-established" message to the other servers. The gate-established message indicates the time associated with the new gate. Because the time established for the new gate is necessarily after the time at which the servers began generating flashback entries, a flashback entry will exist for all first-after-gate changes made by the servers regardless of when they receive the gate-established message.

In response to receiving the gate-established message, the other servers stop generating flashback entries for all updates, and start generating flashback entries for only first-after-gate updates. Returning to the present example, S2 and S3 receive a gate-established message from S1 that indicates G3 was established at 5 pm. S2 and S3 cease to generate flashback entries for all updates, and begin generating flashback entries for the first update made to any given block after 5 pm.

The two-phase gate creation technique described above avoids the problems associated with synchronization because, even if a server receives the gate-established message after the time associated with the gate, the server will have generated flashback entries for any changes made between the time associated with the gate and the time at which the server receives the gate-established message. For example, even if S2 receives the gate-established message for G3 at 5:01 pm, S2 will have generated flashback information for all updates made after 5:00 pm, which is the time associated with gate G3.

As mentioned above, the coordinator generates a gate marker for the gate that it establishes. According to one embodiment, a gate marker that is generated for gates in a multiple-server environment are similar to gate markers generated in single-server environments, except that in a multiple-server environment the gate marker includes data that indicates the locations, within the flashback logs of the other servers, that are associated with the gate. For example, the flashback marker for gate G3 that is stored in the flashback log of S1 includes data that indicates S2-POS1 in the flashback log of S2, and S3-POS1 in the flashback log of S3. Thus, when performing physical recovery based on G3, the marker for G3 will indicate where to start processing flashback entries in the flashback logs of each of S1, S2 and S3.

In an alternative embodiment, gate markers for a particular gate may be placed in each of the separate flashback logs. For example, the flashback marker for gate G3 stored in the flashback log of S1 would indicate the location within the flashback log of S1 associated with gate G3. A separate flashback marker for gate G3 would be stored in the flashback log of S2, and indicate the location S2-POS1. Yet another flashback marker for gate G3 would be stored in the flashback log of S3, and indicate the location S3-POS1.

According to an embodiment where a single gate marker is used to indicate the gate position for all servers, servers respond to begin-logging messages by sending both their current location in their respective flashback logs, and their current location in their physiological redo logs. Both pieces of information may be stored in the marker for the gate. Consequently, when the database is reverted to a previous physical state based on the gate, the information in the gate marker will indicate not only where to begin processing flashback entries in the various flashback logs, but also where to begin processing redo entries within the various physiological redo logs.

Timing

To ensure the integrity of the repository, certain operations must be performed in a particular sequence. The timing dependencies that are applicable to the flashback log maintenance operations used by one embodiment include:

The flashback entry that contains the pre-update image of a block must be flushed to non-volatile memory at or before the time that the updated copy of the block is flushed to non-volatile memory. For example, referring to FIG. 1C, flashback entry 136 must be flushed to flashback log 106 at or before the time that revised copy 124 of block 120 is flushed to repository 112.

The redo entries for all changes reflected in a prior image of a block must be flushed to non-volatile memory at or before the time that the flashback entry containing the prior image is flushed to non-volatile memory. For example, assume that a block B1 is updated at 4:49 pm, causing a redo record R1 to be generated. Further assume that a flashback entry F1 is generated for a first-after-gate update to a block B1, where the gate G3 that caused the generation of F1 is associated with 5 pm. Under these circumstances, the prior image of B1 that is contained in F1 will reflect the change that was made at 4:49 pm. Consequently, R1 must be flushed to non-volatile memory at or before the time that F1 is flushed to non-volatile memory.

One technique for ensuring that redo for a change is flushed to non-volatile memory before a prior image that reflects the change is flushed to non-volatile memory involves, at the time a gate is established, flushing to non-volatile storage all redo associated with changes made before the gate. Thus, when G3 is established at 5 pm, all redo associated with changes made before 5 pm are flushed to non-volatile storage. Consequently, the flashback entries for G3 will not reflect any changes for which redo information is not already reflected on non-volatile memory.

Optimizations

Various techniques may be used to improve the performance of recovery operations performed as described herein. For example, assume that no data has yet been stored on a block B1. If the first update to B1 is a first-after-gate update, a flashback entry will be generated with the pre-update image of B1. In this case, however, the pre-update image of B1 does not contain any useful information. Therefore, when a first-after-gate update is made to a block that does not yet store any information that needs to be retained, a special flashback entry is generated. The special flashback entry does not contain the full pre-update image of the block, but merely identifies the block and indicates that the block did not contain any needed information.

As another example, in some situations, such as INSERT operations, the prior version of a block may not already be in volatile memory when a first-after-gate update is performed on the block. Under these circumstances, the prior image of the block usually must be read from non-volatile storage in order to generate the flashback entry for the update. However, the need to read the prior image from non-volatile storage may be avoided if it is known that the prior image of the block does not contain any information that must be remembered. According to one embodiment, if the block was previously storing data for a structure (such as a table) that has subsequently been dropped, then it is determined whether the structure was dropped before the time associated with the oldest gate to which the database may be reverted. If the structure was dropped before the time associated with the oldest gate to which the database may be reverted, then the prior image need not be read from disk. Instead, a special flashback entry may be used to identify the block, and indicate that the block did not contain any needed information.

For example, if the block previously stored part of a table that was dropped one week ago, and the oldest gate needed for the database is two days ago, then the block belonged to a structure that was dropped before the time associated with the oldest gate to which the database may be reverted. Consequently, a special flashback entry that does not contain the prior image of the block may be used for the block.

Another technique that may be employed to conserve resources involves combining the physical and physiological undo logs into a single undo log that contains sufficient information to revert the repository back to a consistent state. Use of a combined undo log can avoid a significant amount of redundancy between the information maintained in separate physical and physiological undo logs. Alternatively, such redundancy can be avoided by generating flashback entries only in situations where the physiological undo does not have sufficient information to revert a block back to a prior state. The specific circumstances where physiological undo would not have sufficient information will vary from implementation to implementation, and may hinge, for example, on the specific type of block that is being updated.

According to another technique, blocks that contain header information about files are treated differently than blocks that store the data that constitutes the content of the files. According to one embodiment, the flashback entries that are generated for file header blocks do not contain the entire prior image of the header blocks. Rather, the flashback entries for file header blocks describe meta changes to the files, and are applied logically to the file rather than by completely overwriting the corresponding file header blocks. For example, such a flashback entry may indicate that a file was expanded at a particular point in time. Application of such a flashback entry involves shrinking the file back to its original boundaries. Similarly, a flashback entry may indicate the addition of a file to the repository. Application of the flashback entry involves deleting the added file.

Hardware Overview

Figure 3:
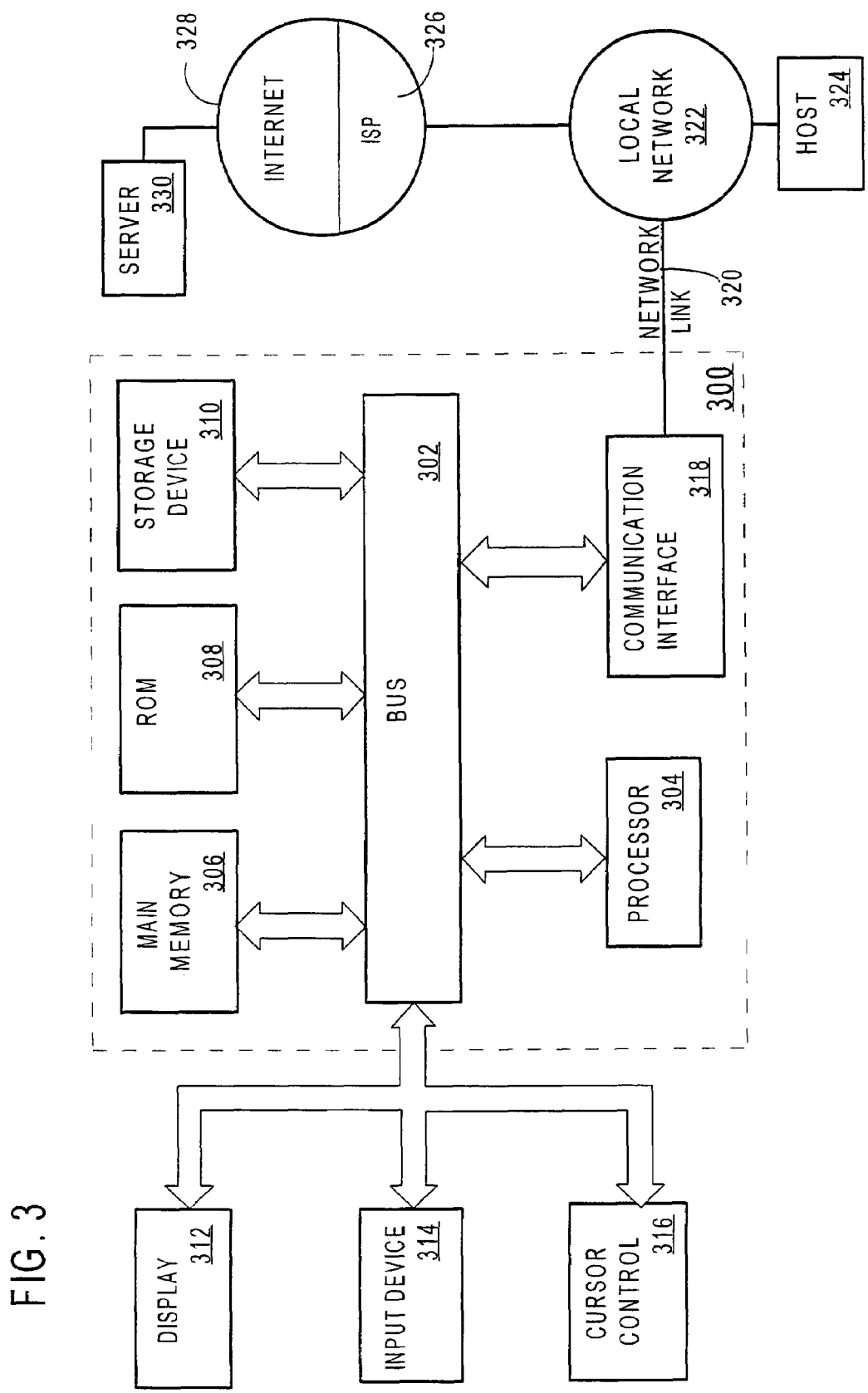
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for returning a repository to a target prior logical state, comprising the steps of:

receiving a request to return said repository to said target prior logical state, wherein said target prior logical state is a consistent state of said repository at a target point in time, and wherein said target prior logical state is prior to a most recent consistent logical state of said repository;

in response to said request, performing the steps of:

applying undo to data that is persistently stored in said repository, wherein said undo includes information necessary to return said data back to a previous state, and wherein application of the undo causes said data to reflect said previous state; and after applying said undo, applying redo to move said data from said previous state to said target prior logical state, wherein said redo includes information about how to re-perform changes to said data;

wherein the steps are performed on one or more computing devices.

2. The method of claim 1, wherein:

the step of applying said undo includes assigning undo records to a plurality of processes; and the plurality of processes apply the undo records in parallel relative to each other.

3. A computer-readable storage medium carrying one or more sequences of instructions which, when executed by one or more processors, causes the one or more processors to perform the method recited in claim 2.

4. The method of claim 1, wherein:

the step of applying said undo causes blocks in said repository to reflect times prior to said target point in time; and the step of applying redo includes applying said redo to move said data in said repository forward in time to said target prior logical state.

5. A computer-readable storage medium carrying one or more sequences of instructions which, when executed by one or more processors, causes the one or more processors to perform the method recited in claim 4.

6. The method of claim 4, wherein said undo is a first type of undo, wherein the step of applying redo includes, after applying said redo, applying a second type of undo to remove from at least some of said data changes that were made by transactions that had not committed at or before said target point in time.

7. A computer-readable storage medium carrying one or more sequences of instructions which, when executed by one or more processors, causes the one or more processors to perform the method recited in claim 6.

8. The method of claim 1, wherein the step of applying said undo to said data in said repository includes:

applying, to a first set of said data, said undo associated with a gate that corresponds to a particular point in time, wherein said gate is a specific point in time for which said undo is generated; and applying, to a second set of said data, said undo associated with an anticipatory gate that precedes said gate.

9. A computer-readable storage medium carrying one or more sequences of instructions which, when executed by one or more processors, causes the one or more processors to perform the method recited in claim 8.

10. The method of claim 8, further comprising:

generating said undo for some but not all first-after-anticipatory-gate updates made after said anticipatory gate; and generating said undo for all first-after-gate updates made after said gate, except for updates made to data for which said undo was generated after said anticipatory gate.

11. A computer-readable storage medium carrying one or more sequences of instructions which, when executed by one or more processors, causes the one or more processors to perform the method recited in claim 10.

12. The method of claim 10, further comprising:
determining whether to generate said undo for a first-after-anticipatory-gate update based on availability of resources when said first-after-anticipatory-gate update is performed.

13. A computer-readable storage medium carrying one or more sequences of instructions which, when executed by one or more processors, causes the one or more processors to perform the method recited in claim 12.

14. The method of claim 1, further comprising:
generating said undo based on gates that are associated with particular points in time;
storing said undo as a series of flashback records in a flashback log; and
storing data that correlates said gates with locations in said flashback log.

15. A computer-readable storage medium carrying one or more sequences of instructions which, when executed by one or more processors, causes the one or more processors to perform the method recited in claim 14.

16. The method of claim 14, wherein the step of storing data that correlates said gates with locations in said flashback log includes storing, for each gate of said gates, a gate marker within said flashback log.

17. A computer-readable storage medium carrying one or more sequences of instructions which, when executed by one or more processors, causes the one or more processors to perform the method recited in claim 16.

18. The method of claim 16, further comprising the step of using the gate marker associated with a gate to determine which flashback records to process to return said repository to the previous state associated with said gate.

19. A computer-readable storage medium carrying one or more sequences of instructions which, when executed by one or more processors, causes the one or more processors to perform the method recited in claim 18.

20. The method of claim 16, wherein:
the gate marker includes data that indicates a location in a redo log; and
the method further includes using said location in the redo log to determine which redo to process.

21. A computer-readable storage medium carrying one or more sequences of instructions which, when executed by one or more processors, causes the one or more processors to perform the method recited in claim 20.

22. The method of claim 16, wherein:
the gate marker includes data that indicates a location in said flashback log; and
the method further includes using said location in the flashback log to determine which flashback entries to process.

23. A computer-readable storage medium carrying one or more sequences of instructions which, when executed by one or more processors, causes the one or more processors to perform the method recited in claim 22.

24. The method of claim 16, further comprising storing, within each gate marker, a link to a previous gate marker in said flashback log.

25. A computer-readable storage medium carrying one or more sequences of instructions which, when executed by one or more processors, causes the one or more processors to perform the method recited in claim 24.

26. The method of claim 1, wherein:
a plurality of entities have access to said repository; and
each entity of said plurality of entities maintains a separate log containing undo information, for said undo, for at least some of the data.

27. A computer-readable storage medium carrying one or more sequences of instructions which, when executed by one or more processors, causes the one or more processors to perform the method recited in claim 26.

28. The method of claim 26, further comprising establishing a gate by performing the steps of:
designating one of said plurality of entities to be a coordinator;
causing the coordinator to send to each other of said entities a begin-logging message;
causing each other entity to respond to the begin-logging message by generating said undo for all updates;
after sending the begin-logging message, causing the coordinator to send to each other of said entities a gate-established message; and
causing each other entity to respond to the gate-established message by only generating said undo for first-after-gate updates.

29. A computer-readable storage medium carrying one or more sequences of instructions which, when executed by one or more processors, causes the one or more processors to perform the method recited in claim 28.

30. The method of claim 28, wherein:
each other entity also responds to the begin-logging message by sending to the coordinator a response; and
the coordinator sends the gate-established message after receiving responses for all of said other entities.

31. A computer-readable storage medium carrying one or more sequences of instructions which, when executed by one or more processors, causes the one or more processors to perform the method recited in claim 30.

32. The method of claim 30, wherein:
the response sent by each other entity indicates a location within the separate log of the entity; and
the coordinator stores data that associates said gate with location information, wherein said location information identifies the locations indicated in the responses received from said each other entity.

33. A computer-readable storage medium carrying one or more sequences of instructions which, when executed by one or more processors, causes the one or more processors to perform the method recited in claim 32.

34. The method of claim 32, wherein the step of storing data that associates said gate with location information includes storing, within the separate log of said coordinator, a marker for said gate, wherein said marker includes links to the locations indicated in the responses received from said each other entity.

35. A computer-readable storage medium carrying one or more sequences of instructions which, when executed by one or more processors, causes the one or more processors to perform the method recited in claim 34.

36. A computer-readable storage medium carrying one or more sequences of instructions which, when executed by one or more processors, causes the one or more processors to perform the method recited in claim 1.

37. A method for reverting a repository to a prior state, comprising the steps of:
establishing an anticipatory gate associated with a first point in time;
generating first undo for some but not all first-after-anticipatory-gate updates made to data that resides in the repository;
establishing a gate associated with a second point in time that is later than said first point in time;
generating second undo for all first-after-gate updates made to data that resides in the repository, except for updates made to data for which said first undo was generated for said anticipatory gate;

reverting said repository to a state at least as early as said second point in time by performing the steps of:

using the first undo associated with said anticipatory gate to revert a first set of data of said repository back to a time that precedes said second point in time; and using the second undo associated with said gate to revert a second set of data of said repository back to said second point in time;

wherein the steps are performed on one or more computing devices.

38. A computer-readable storage medium carrying one or more sequences of instructions which, when executed by one or more processors, causes the one or more processors to perform the method recited in claim 37.

39. The method of claim 37, further comprising the step of determining whether to generate said second undo for a first-after-anticipatory-gate update based on availability of resources when said first-after-anticipatory-gate update is performed.

40. A computer-readable storage medium carrying one or more sequences of instructions which, when executed by one or more processors, causes the one or more processors to perform the method recited in claim 39.

* * * * *

UNITED STATES PATENT AND TRADEMARK OFFICE
CERTIFICATE OF CORRECTION

PATENT NO. : 7,631,018 B2
APPLICATION NO. : 11/652782
DATED : December 8, 2009
INVENTOR(S) : J. William Lee et al.

Page 1 of 1

It is certified that error appears in the above-identified patent and that said Letters Patent is hereby corrected as shown below:

Title page, item (*) Notice:  should read as follows:  Subject to any disclaimer, the term of this patent is extended or adjusted under 35 U.S.C. 154(b) by 292 days.

On the title page, item (75), in column 1, in "Inventors", line 1, delete "Redwood Shores," and insert -- Belmont, --, therefor.

On the title page, item (75), in column 1, in "Inventors", line 2, delete "Redwood City," and insert -- Woodside, --, therefor.

On page 2, in column 1, under "Other Publications", line 3, delete "Juje" and insert -- June --, therefor.

In column 2, line 19, delete "support" and insert -- supports --, therefor.

In column 5, line 43, delete "re-update" and insert -- pre-update --, therefor.

In column 7, line 52, delete "B I" and insert -- B1 --, therefor.

Signed and Sealed this

Fourteenth Day of September, 2010

David J. Kappos
*Director of the United States Patent and Trademark Office*